United States Patent [19]

Hadley

[11] Patent Number: 5,065,681
[45] Date of Patent: Nov. 19, 1991

[54] HYDRAULIC DOWN PRESSURE STRUCTURE FOR AN IMPLEMENT WITH MULTIPLE GROUND ENGAGING TOOLS

[75] Inventor: Howard C. Hadley, Des Moines, Iowa

[73] Assignee: Deere & Company, Moline, Ill.

[21] Appl. No.: 595,323

[22] Filed: Oct. 10, 1990

[51] Int. Cl.⁵ .......................... A01C 5/06; A01B 63/32
[52] U.S. Cl. ....................................... 111/55; 111/61; 111/66; 111/926; 172/464
[58] Field of Search .................. 111/52, 55, 60, 61, 111/62, 66, 68, 151, 149, 926; 172/260.5, 462, 464, 465, 478, 482, 487, 488, 500, 776

[56] References Cited

U.S. PATENT DOCUMENTS

| | | |
|---|---|---|
| 3,494,427 | 2/1970 | Greig et al. ................. 111/66 X |
| 3,561,541 | 2/1971 | Woelfel . |
| 3,747,422 | 7/1973 | Rikli . |
| 3,749,035 | 7/1973 | Cayton et al. . |
| 4,044,697 | 8/1977 | Swanson . |
| 4,149,475 | 4/1979 | Bailey et al. . |
| 4,291,638 | 9/1981 | Renwick . |
| 4,422,511 | 12/1983 | Poggemiller et al. . |
| 4,648,466 | 3/1987 | Baker et al. ............... 172/464 X |

FOREIGN PATENT DOCUMENTS

| | | | |
|---|---|---|---|
| 930233 | 7/1973 | Canada ................. 111/926 |
| 425572 | 4/1974 | U.S.S.R. ................. 111/926 |
| 502622 | 2/1976 | U.S.S.R. ................. 111/926 |
| 1232162 | 5/1986 | U.S.S.R. ................. 111/926 |

Primary Examiner—Dennis L. Taylor
Assistant Examiner—Jeffrey L. Thompson

[57] ABSTRACT

An improved down pressure arrangement for an implement such as a multi-section grain drill having fixed-height section frames with corresponding gangs of opener assemblies. The opener assemblies of each gang are yieldingly biased downwardly by a spring and bracket structure operably connected to a rockshaft. One rockshaft per gang is provided, and each rockshaft is controlled by a single down pressure adjusting cylinder. The cylinders are connected in parallel and to a pressure regulator to provide adjustable and uniform average opener down pressure across the width of the drill for more contant opener depth in irregular ground conditions. Tension links connected to the bracket structure permit the opener assemblies to be raised from a ground-working position to a transport position.

14 Claims, 1 Drawing Sheet

HYDRAULIC DOWN PRESSURE STRUCTURE FOR AN IMPLEMENT WITH MULTIPLE GROUND ENGAGING TOOLS

BACKGROUND OF THE INVENTION

1) Field of the Invention

The present invention relates generally to seeding implements and, more specifically, to structure for providing constant and even down pressure on gangs of openers mounted on a relatively wide drill or similar implement.

2) Related Art

Seeding implements such as grain drills are manufactured with increasing widths for better productivity. Often, two or three drill sections are mounted on a carrier or are otherwise foldable for narrow transport. One problem has been maintaining a relatively constant down pressure on the furrow openers or other ground engaging tools across the width of the implement so that seeding depth remains uniform. As seed box weight changes and as irregular ground surfaces are encountered, the pressure and therefore the depth at which the tools operate can change substantially from one portion of the machine to the next, resulting in an uneven seed germination, inconsistent crop maturity and lower yields. When large obstacles such as rocks, stumps and the like are encountered, high loads may be experienced by a few of the tools.

To overcome problems associated with uneven ground conditions, flexible linkages on drill box carriers have been used. However, such linkages create complex mechanical design problems, and down pressure typically varies with the weight of the seed in the box.

Other arrangements to overcome surface irregularity problems and changing weight have included use of hydraulic cylinders. For example, U.S. Pat. No. 4,044,697 shows a hydraulic system wherein one cylinder is provided for each opener arm, and the cylinders are connected in a parallel circuit so an even amount of pressure is applied to each of the openers. Another parallel arrangement of hydraulic actuators for applying even down pressure to furrow-forming units is shown in U.S. Pat. No. 3,749,035. The individual cylinders, which add to the expense of the implement and require a considerable amount of plumbing, make such arrangements impractical for wide implements and implements with narrowly spaced openers. Uniform raising and lowering of the openers between the transport and ground working positions can also be a problem with use of a large number of parallel-connected cylinders.

BRIEF SUMMARY OF THE INVENTION

It is therefore an object of the present invention to provide an improved down pressure arrangement for an implement. It is another object to provide such an arrangement which achieves a more constant down pressure on the ground engaging tools, even in irregular ground surface conditions. It is still another object to provide such an arrangement which is simpler and has fewer hydraulic cylinders than at least many previously available down pressure devices.

It is a further object to provide an improved down pressure arrangement for a relatively wide implement having a large number of ground engaging tools. It is another object to provide such an arrangement wherein the desired pressure at the tools can be consistently maintained regardless of changes in the ground contour or in implement weight.

It is still another object of the present invention to provide an improved down pressure arrangement for a multi-section implement which is relatively simple and inexpensive in construction and yet which provides consistent down pressure to the individual tools across the width of the implement, even in varying ground conditions. It is a further object to provide such an arrangement which advantageously utilizes a combination of hydraulically controlled, constant pressure rockshafts with spring-biased tools to achieve more uniform down pressure for even depth control while operating in the field.

An implement constructed in accordance with the teachings of the present invention includes at least one and preferably two or more transverse rockshafts supported on the implement frame and connected to a plurality of ground-engaging tools such as furrow openers. Each rockshaft is connected to a single hydraulic cylinder, and the cylinders are connected in parallel with each other and to a pressure sensing valve. The valve allows a predetermined amount of pressure at each cylinder at all times during field-working operations to establish a rockshaft bias which operates through spring assemblies extending between the rockshaft and each tool to urge the tools into ground engagement with the desired pressure. The spring assemblies allow relative vertical movement of the tools associated with each rockshaft, while the pressure controlled cylinder assures a constant average down pressure across the width of the rockshaft. With constant pressure on each of the rockshafts, the tools will be urged into the soil with generally uniform pressure across the width of the implement regardless of surface irregularities so that tool depth will remain consistent. The parallel connected cylinders permit a wide range of relative rocking between the rockshafts in rough or hilly terrains so that the selected down pressure is maintained. Only a single valve and a minimum number of cylinders (one for each rockshaft) are required so the system is relatively simple and inexpensive. Tool depth variations resulting from implement weight changes are eliminated, and complex mechanical linkages are unnecessary. The spring assemblies include tension links which facilitate even lifting of the tools from the field-working to the transport positions using the rockshaft cylinders.

These and other objects, features and advantages of the present invention will become apparent to one skilled in the art upon reading the following detailed description in view of the drawings.

DETAILED DESCRIPTION OF THE DRAWINGS

Figure 1:
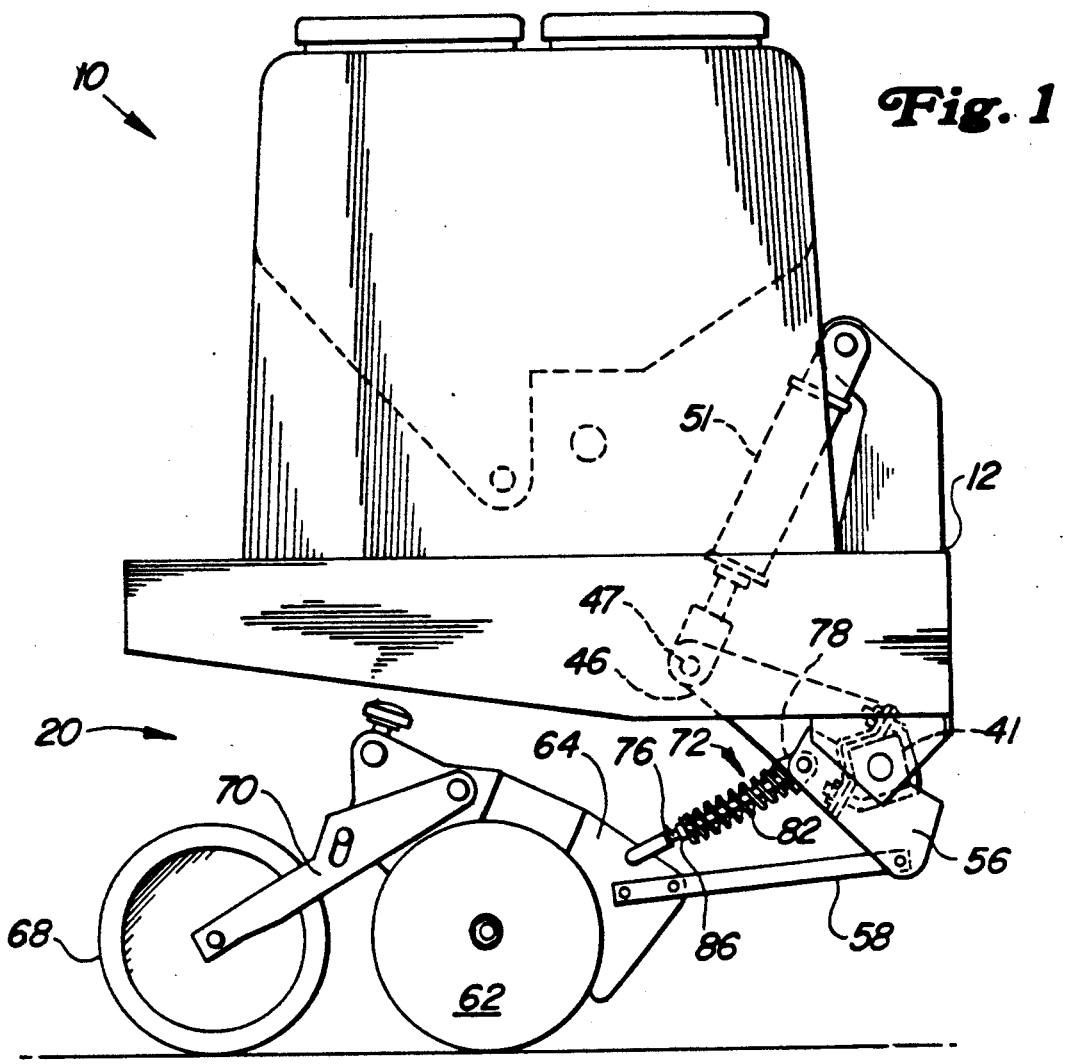
FIG. 1 is a side view of a portion of a multi-section grain drill with the down pressure structure attached thereto and showing furrow opener assemblies in the lowered field-working position.

Referring now to FIG. 1, therein is shown an agricultural implement 10 including a transversely extending main frame 12 supported for forward movement over the ground by wheels (not shown) at generally a constant distance above the ground. A plurality of ground engaging tool assemblies 20 are mounted for rocking vertically with respect to the frame 12 between a lowered ground engaging position (FIG. 1) and a raised transport position. As shown in the figures, the implement 10 is a multi-section grain drill having a center section 31 and right and left outboard sections 32 and 33, respectively, supported by a wheeled carrier. The sections 32 and 33 are foldable with respect to the section 31, preferably about upright axes, to narrow the implement 10 for transport by the carrier.

The implement sections 31, 32 and 33 include transverse rockshafts 41, 42 and 43, respectively, supported for rotation by the frame 12. Connected to each of the transverse rockshafts is a set of the ground engaging tool assemblies 20. A cylinder bracket 46 (FIG. 1) is also connected to each of the rockshafts and extends radially therefrom to a cylinder connecting end 47 which is pivotally connected to the rod end of one of three hydraulic cylinders 51, 52 and 53 associated with the respective sections 31, 32 and 33. Each cylinder is connected at its cylinder end to the portion of the implement frame 12 on the corresponding section. Each of the tool assemblies 20 is connected to the corresponding rockshaft by a bracket 56 fixed to the rockshaft for rocking therewith as the cylinder is extended and retracted.

As shown in FIG. 1, the tool assemblies 20 are conventional grain drill openers having a fore-and-aft extending support arm 58 pivotally connected at its upper forward end to the lower forward end of the bracket 56. The support arm 58 extends downwardly and rearwardly to a conventional disk furrow opener 62 rotatably mounted on a support casting 64 fixed to the lower end of the support arm 58. A trailing press wheel 68 is rotatably mounted behind the disk 62 by an opener arm 70 pivotally connected to the casting 64. A down pressure assembly 72 is connected between the upper aft end of the bracket 56 and the casting 64 above the lower end of the support arm 58. The down pressure assembly 72 includes an adjustable tension link member 76 pivotally connected to the casting 64 and slidably received within the upper end of an upper spring abutment member 78 which is pivotally connected to the upper aft end of the bracket 56. A coil spring 82 is compressed between the member 78 and a lower 10 spring abutment member 86 fixed to the tension link 76. The length of the tension link member 76 is adjusted such that when the cylinder 51 is fully retracted, the link will rock the support arm 58 upwardly a sufficient distance (FIG. 2) to provide good clearance between the surface of the ground and the opener assembly 20.

Referring to FIG. 1, as the cylinder 51 is extended the rockshaft 41 is rocked in the counter-clockwise direction to move the disk 62 and press wheel 68 into contact with the ground. Once in contact with the ground, further extension of the cylinder 51 causes the spring 82 to compress and urge the assembly 20 downwardly. Therefore the downward pressure on the opener assembly 20 is dependent upon the pressure of the cylinder 51. Each set or gang of opener assemblies 20 are vertically rockable independently of the remaining gangs.

Figure 2:
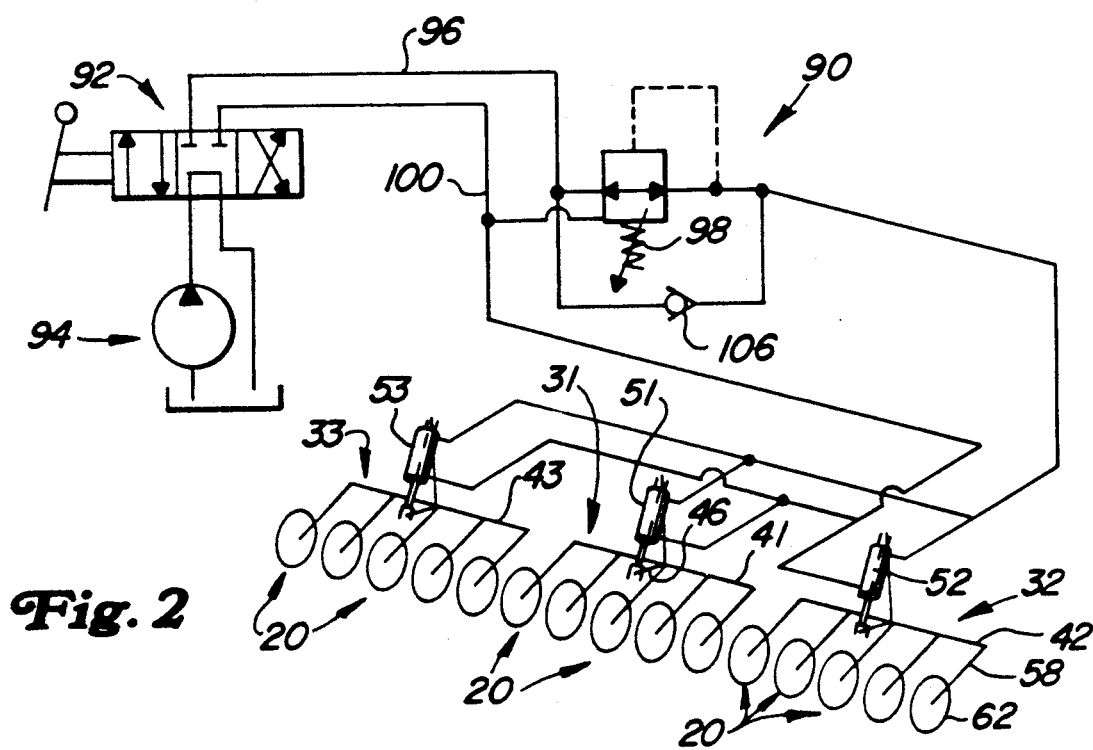
FIG. 2 is a schematic representation of the down pressure structure utilized with the grain drill of FIG. 1.

As shown in FIG. 2, the cylinders 51, 52 and 53 are connected in parallel with each other through a pressure regulator valve 90 and an operator control valve 92 to a source of hydraulic fluid under pressure 94 located on the towing vehicle. When the operator control valve is moved to the right from the neutral position shown in FIG. 2, pressure is applied via line 96 through the pressure regulator valve 90 to the base ends of the cylinders 51, 52 and 53 to pivot the corresponding rockshafts 41, 42 and 43 about their axes to move the ground engaging assemblies 20 into contact with the soil. The cylinders 51, 52 and 53 continue to extend until a preselected control pressure, as determined by the setting on a pressure control knob 98 of the valve 90, is reached. Thereafter, fluid will be diverted from the cylinders through the valve 90 to the return line 100. As shown in FIG. 2, the hydraulic system is closed center and maintains fluid flow during field-working operations.

The valve 90 assures that a predetermined amount of pressure operates at the cylinders at all times during the field-working operations to establish a preselected rockshaft bias in each of the rockshafts 41, 42 and 43. The pressure remains constant in each of the cylinders over substantially the full extension range so that substantial irregularities in ground contour are accommodated with consistent average down pressure across the width of the implement. For example, if the right section 32 encounters a valley at the same time the left section 33 encounters a high spot or mound of dirt, the cylinder 52 will extend and the cylinder 53 will retract as necessary, up to the full stroke of the cylinders, to maintain constant average down pressure. In addition, the down pressure assemblies 72 assure that surface irregularities across the width of each section are accommodated with minimal down pressure variations in the assemblies 20 associated with that section. The down pressure assemblies 72 permit rocking of each of the assemblies 20 relative to the other assemblies, but the average pressure across the width of the corresponding rockshaft remains constant and is determined by the pressure control setting.

As shown in FIG. 2, the cylinders 51, 52 and 53 are of equal diameter, and each of the sections 31, 32 and 33 have equal numbers of ground-engaging assemblies 20 connected thereto so that the average down pressure across the width of the entire implement 10 is substantially constant. If the sections of the implement have unequal number of assemblies 20, equal average down pressure on the gangs is achieved by sizing the cylinders in proportion to the number of assemblies associated with the rockshafts. For example, if there are thirty assemblies 20 connected to the rockshaft 41 and twenty assemblies 20 on each of the outer rockshafts 42 and 43, the effective working area of each of the pistons on the outer cylinders 52 and 53 will preferably be approximately two-thirds the effective working area of the pistons on the cylinder 51.

Upon the retraction of the cylinders 51, 52 and 53, by moving the operator control valve 92 to the right (FIG. 2), the line 100 is pressurized to cause the cylinders to retract. Return flow from the base ends of the cylinders through the line 96 is facilitated by a check valve 106 in the valve 90. As the cylinders retract and rotate the rockshafts in the clockwise direction, the brackets 56 pull upwardly and forwardly on the tension links 76 to raise the assemblies 20 from the ground-engaging positions toward the transport positions.

Preferably, the pressure regulator valve 90 is a commercially available adjustable pressure reducing valve, such as of the model PRV 1, available from Modular Controls Corporation of Villa Park, Ill. If necessary to accommodate different types of implement section construction, controlled pressure retraction rather than extension of the cylinders may be provided by reversing the lines to the cylinders 51, 52 and 53.

Having described the preferred embodiment, it will become apparent that various modifications can be made without departing from the scope of the invention as defined in the accompanying claims.

I claim:

1. In an implement adapted for towing by a vehicle having a source of hydraulic fluid under pressure, the implement including a transversely extending frame and a plurality of ground engaging tools, down pressure structure comprising:

at least a first rockshaft pivotally connected to the frame;

means connecting a first set of the tools to the first rockshaft for vertical movement with respect to the frame as the rockshaft is pivoted;

a first extendible and retractable cylinder having a first end connected to the frame, and a second end;

means connecting the second end to the rockshaft for pivoting the rockshaft and moving the tools between lowered ground-engaging and raised transport positions as the cylinder is extended and retracted;

means connecting the first cylinder to the source of hydraulic fluid for biasing the rockshaft about the rockshaft axis to move the tools toward the ground engaging positions;

a second rockshaft pivotally mounted on the frame for rotation relative to the frame and to the first rockshaft, a second cylinder connected to and for rocking of the second rockshaft, means connecting a second set of the tools to the second rockshaft for vertical movement with respect to the frame as the second rockshaft is rotated; and a pressure regulating valve connected between the source and the first and second cylinders for maintaining first and second preselected rockshaft biases on the respective first and second rockshafts when the first and second sets of tools are in the ground engaging positions to thereby establish a preselected average down pressure on the tools.

2. The invention as set forth in claim 1 wherein the means connecting the first set of tools to the first rockshaft includes a plurality of brackets connected to the first rockshaft and a spring connected between each tool and a corresponding bracket for biasing the tool when in the ground engaging position toward a lowermost position while facilitating relative vertical rocking of the tools, whereby the average bias on the springs is dependent on the preselected rockshaft bias.

3. The invention as set forth in claim 1 wherein the ratio of the second rockshaft bias relative to the bias on the first rockshaft is generally proportional to the ratio of the number of tools on the second rockshaft relative to the number of tools on the first rockshaft so that the average down pressures on the first and second sets of tools are approximately equal.

4. The invention as set forth in claim 1 wherein the first and second cylinders are connected in parallel.

5. The invention as set forth in claim 4 including spring means connected between the first and second rockshafts and the corresponding first and second sets of tools for yieldingly biasing the tools toward a lowermost position when the tools are in the ground engaging positions.

6. In an implement having a transversely extending frame and at least first and second gangs of opener assemblies connected to corresponding first and second rockshafts for independent vertical rocking with respect to the frame between lowered field-working positions and raised transport positions, down pressure structure comprising:

first and second cylinders connected to the first and second rockshafts, respectively;

conduit means connecting the cylinders to a source of hydraulic fluid under pressure for operating the cylinders in parallel to apply down pressure to the first and second opener assemblies when in the lowered field-working positions; and pressure regulator means connected to the conduit means for maintaining a preselected pressure at the first and second cylinders to rotate the rockshafts and thereby establish a preselected average down pressure for the opener assemblies of each of the gangs, the average down pressure of the opener assemblies of the first gang being substantially equal to that of the average down pressure of the opener assemblies of the second gang.

7. The invention as set forth in claim 6 further comprising spring means connected between the rockshafts and the corresponding opener assemblies for yieldingly biasing the opener assemblies downwardly when the assemblies are in the lowered field-working positions.

8. The invention as set forth in claim 7 including a bracket connected between the rockshaft and each of the opener assemblies, wherein the spring means comprises a coil spring compressed between the bracket and the corresponding opener assembly, and a tension link connected between the opener assembly and the bracket.

9. The invention as set forth in claim 6 wherein the pressure regulating means comprises a pressure sensing valve.

10. In a multi-section implement having at least first and second transversely extending section frames with seed boxes supported a preselected distance above the ground by carriage structure, and first and second gangs of opener assemblies connected to corresponding first and second rockshafts, respectively, for independent vertical rocking of the gangs with respect to each other and the corresponding frames between lowered field-working positions and raised transport positions, down pressure structure comprising:

first and second cylinders connected between the first and second section frames and the first and second rockshafts, respectively;

conduit means connecting the cylinders to a source of hydraulic fluid under pressure for operating the cylinders to apply down pressure to the first and second gangs of opener assemblies when in the lowered field-working positions; and pressure regulator means connected to the conduit means for maintaining a preselected pressure at the first and second cylinders to rotate the rockshafts and thereby establish a preselected average down pressure for the opener assemblies of each of the gangs, the ratio of the average down pressure of the opener assemblies of the first gang to that of the second gang being substantially constant.

11. The invention as set forth in claim 10 wherein the conduit means includes means for connecting the first and second cylinders for operation in parallel.

12. The invention as set forth in claim 11 wherein the average opener down pressure for the openers of the first gang is approximately equal to the average opener down pressure for the openers of the second gang.

13. The invention as set forth in claim 10 wherein the opener assemblies include yieldable spring biasing structure for facilitating independent vertical rocking of the opener assemblies on each of the gangs.

14. The invention as set forth in claim 10 wherein the source comprises a closed center hydraulic system, and an operator control valve connected to the source, the pressure regulating means comprising a pressure sensing member for selectively bypassing fluid under pressure away from the cylinders and back to the source.

* * * * *